(12) United States Patent
Fokoue-Nkoutche et al.

(10) Patent No.: US 12,711,130 B1
(45) Date of Patent: Aug. 18, 2026

(54) HETEROGENOUS DATA INTEGRATION FOR LLM PROMPTING

(71) Applicant: International Business Machines Corporation, Armonk, NY (US)

(72) Inventors: Achille Belly Fokoue-Nkoutche, White Plains, NY (US); Srideepika Jayaraman, New York, NY (US); Elham Khabiri, Briarcliff Manor, NY (US); Jeffrey Owen Kephart, Cortlandt Manor, NY (US); Yingjie Li, Chappaqua, NY (US); Dhruv Shah, New York, NY (US); Youssef Drissi, Peekskill, NY (US); Fenno F. Heath, III, Woodbridge, CT (US); Anuradha Bhamidipaty, Yorktown Heights, NY (US); Fateh A. Tipu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/185,769

(22) Filed: Apr. 22, 2025

(51) Int. Cl.
*G06F 16/24* (2019.01)
*G06F 16/21* (2019.01)
*G06F 16/242* (2019.01)

(52) U.S. Cl.
CPC ............ *G06F 16/243* (2019.01); *G06F 16/21* (2019.01)

(58) Field of Classification Search
CPC .................................................... G06F 16/243
(Continued)

(56) References Cited

U.S. PATENT DOCUMENTS 12,135,768 B2 11/2024 Ailawadi et al.
2017/0199910 A1* 7/2017 Konik ................ G06F 9/45558
(Continued)

FOREIGN PATENT DOCUMENTS

CN 117131070 A 11/2023
CN 118151904 A 6/2024
(Continued)

OTHER PUBLICATIONS

Fokoue-Nkoutche, et al., "Preventing Data Exposure During Retrieval Augmented Generation", U.S. Appl. No. 19/203,268, filed May 9, 2025, 32 Pages.
(Continued)

*Primary Examiner* — Syling Yen
(74) *Attorney, Agent, or Firm* — Heather Schuler

(57) ABSTRACT

An embodiment establishes an integrated database comprising data from a set of heterogeneous data sources. The embodiment intercepts, by a database management application, a user input query transmitted to a target system, the user input query written in a natural language format. The embodiment transforms, by a natural language model within the database management application, the user input query into a structured query based on a relational schema, the transforming producing a formatted query. The embodiment modifies the formatted query, the modifying replacing a reference to a virtual table within a call to a user-defined functions (UDF), the modifying producing a final query. The embodiment executes the final query executing the final query, the executing comprising transmitting the final query to the integrated database, the transmitting causing executing a first responsive action based on the final query, the executing the first responsive action producing a first execution result.

20 Claims, 7 Drawing Sheets

(58) Field of Classification Search
USPC .......................................................... 707/760
See application file for complete search history.

(56) References Cited

U.S. PATENT DOCUMENTS

| | | | | |
|---|---|---|---|---|
| 2021/0034636 | A1* | 2/2021 | Waas | G06F 16/252 |
| 2024/0303235 | A1 | 9/2024 | Kulkarni et al. | |
| 2025/0291772 | A1* | 9/2025 | Hoang | G06F 40/40 |

FOREIGN PATENT DOCUMENTS

| | | | |
|---|---|---|---|
| CN | 118427207 | A | 8/2024 |
| CN | 118939679 | A | 11/2024 |
| CN | 119005340 | A | 11/2024 |
| CN | 119203232 | A | 12/2024 |
| CN | 119312927 | A | 1/2025 |
| EP | 4428710 | A1 | 9/2024 |
| FR | 3150317 | A1 | 12/2024 |

OTHER PUBLICATIONS

Allemang et al., "Increasing the LLM Accuracy for Question Answering: Ontologies to the Rescue!", arXiv:2405.11706v1 [cs.AI], May 20, 2024, 16 pages.

Gao et al., "Text-to-SQL Empowered by Large Language Models: A Benchmark Evaluation", arXiv:2308.15363v4 [cs.DB], Nov. 20, 2023, 22 pages.

Jiang et al., "Mixtral of experts", arXiv:2401.04088v1 [cs.LG], Jan. 8, 2024, 13 pages.

Li et al., "API-Bank: A Comprehensive Benchmark for Tool-Augmented LLMs", arXiv:2304.08244v2 [cs.CL], Oct. 25, 2023, 15 pages.

Li et al., "Can LLM already serve as a database interface? A BIg bench for large-scale database grounded Text-to-SQLs", arXiv:2305.03111v3 [cs.CL], Nov. 15, 2023, 28 pages.

No Author, "Build a Question/Answering system over SQL data", https://python.langchain.com/v0.2/docs/tutorials/sql_qa/, dated Jun. 2, 2025, 18 pages.

No Author. "Berkeley Function-Calling Leaderboard", BFCL Leaderboard, Retrieved from web gorilla.cs.berkeley.edu/leaderboard.html, Apr. 13, 2025, 3 pages., gorilla.cs.berkeley.edu/leaderboard.html.

No Author. "langchain_community 0.2.19", retrieved from https://web.archive.org/web/20250414215716/https://api.python.langchain.com/en/latest/community_api_reference.html, Apr. 14, 2025, 47 pages.

No Author. "ReAct", Longchain, retrieved from web python.langchain.com/v0.1/docs/modules/agents/agent_types/react/, Mar. 19, 2025, 5 pages.

Patil et al., "Gorilla: Large Language Model Connected with Massive APIs", arXiv:2305.15334v1 [cs.CL], May 24, 2023, 18 pages.

Pourreza et al., "CHASE-SQL: Multi-Path Reasoning and Preference Optimized Candidate Selection in Text-to-SQL", arXiv:2410.01943v1 [cs.LG], Oct. 2, 2024, 30 pages.

Wang et al., "Traffic Performance GPT (TP-GPT): Real-Time Data Informed Intelligent ChatBot for Transportation Surveillance and Management", arXiv:2405.03076v1 [cs.MA], May 5, 2024, 8 pages.

Xue et al. "Db-gpt: Empowering database interactions with private large language models", arXiv:2312.17449v2 [cs.DB], Jan. 3, 2024, 16 pages.

Yan et al. "On protecting the data privacy of large language models (llms): A survey", arXiv:2403.05156v2 [cs.CR], Mar. 14, 2024.

Yao et al., "React: Synergizing Reasoning and Acting in Language Models", arXiv:2210.03629v3 [cs.CL], Mar. 10, 2023, 33 pages.

Ye et al. "DataFrame QA: A Universal LLM Framework on DataFrame Question Answering Without Data Exposure", arXiv:2401.15463v1 [cs.CL], Jan. 27, 2024, 24 pages.

Yu et al., "Spider: A Large-Scale Human-Labeled Dataset for Complex and Cross-Domain Semantic Parsing and Text-to-SQL Task", arXiv:1809.08887v5 [cs.CL], Feb. 2, 2019, 11 pages.

Zhong et al., "Semantic Evaluation for Text-to-SQL with Distilled Test Suites", arXiv:2010.02840v1 [cs.CL], Oct. 6, 2020, 16 pages.

Zhong et al., "Seq2sql: Generating structured queries from natural language using reinforcement learning", arXiv:1709.00103v7 [cs.CL], Nov. 9, 2017, 12 pages.

* cited by examiner

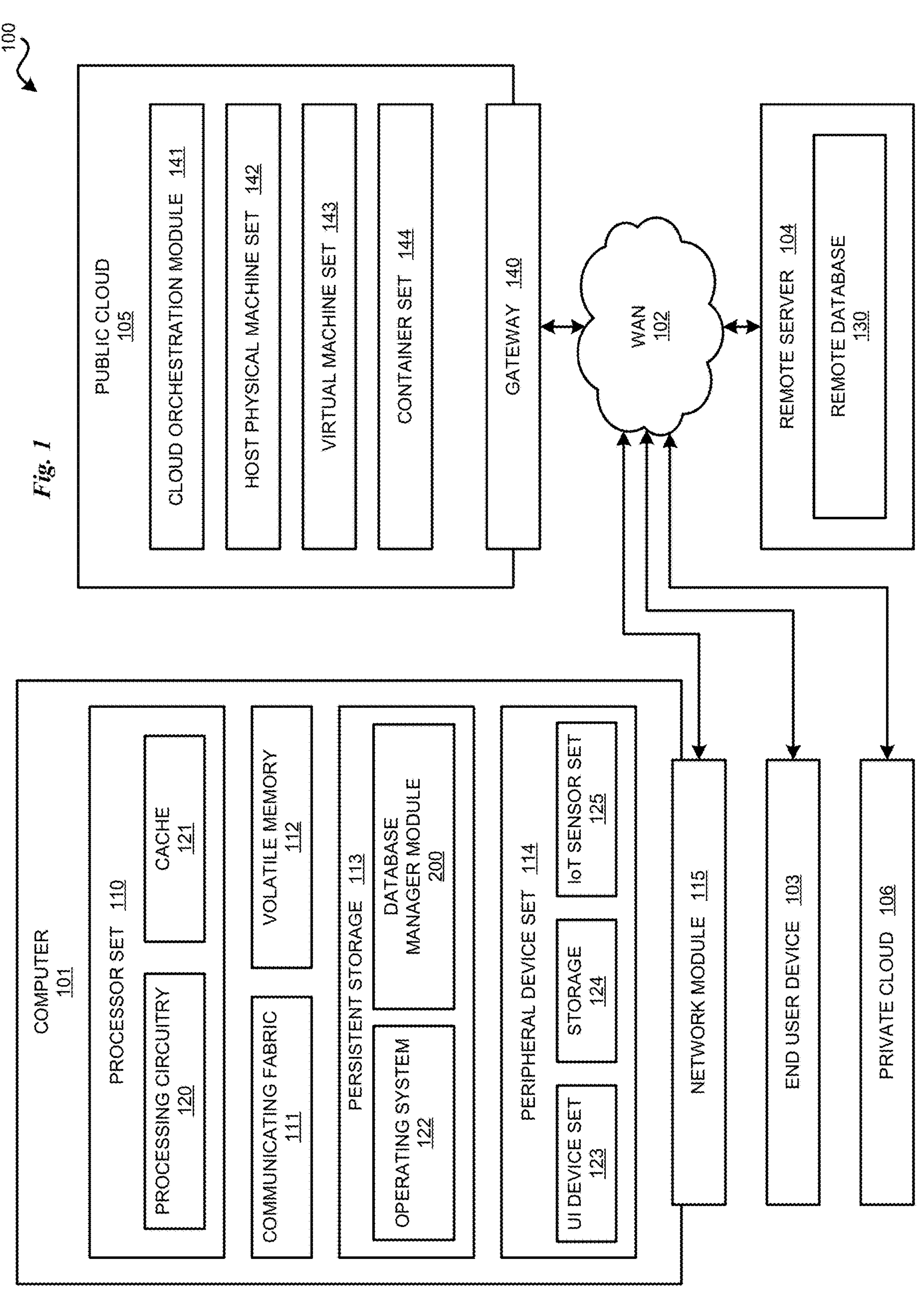
100
Fig. 1
PUBLIC CLOUD
105
CLOUD ORCHESTRATION MODULE 141
HOST PHYSICAL MACHINE SET 142
VIRTUAL MACHINE SET 143
CONTAINER SET 144
GATEWAY 140
WAN
102
REMOTE SERVER 104
REMOTE DATABASE
130
COMPUTER
101
PROCESSOR SET 110
PROCESSING CIRCUITRY
120
CACHE
121
COMMUNICATING FABRIC
111
VOLATILE MEMORY
112
PERSISTENT STORAGE 113
OPERATING SYSTEM
122
DATABASE
MANAGER MODULE
200
PERIPHERAL DEVICE SET 114
UI DEVICE SET
123
STORAGE
124
IoT SENSOR SET
125
NETWORK MODULE 115
END USER DEVICE 103
PRIVATE CLOUD 106

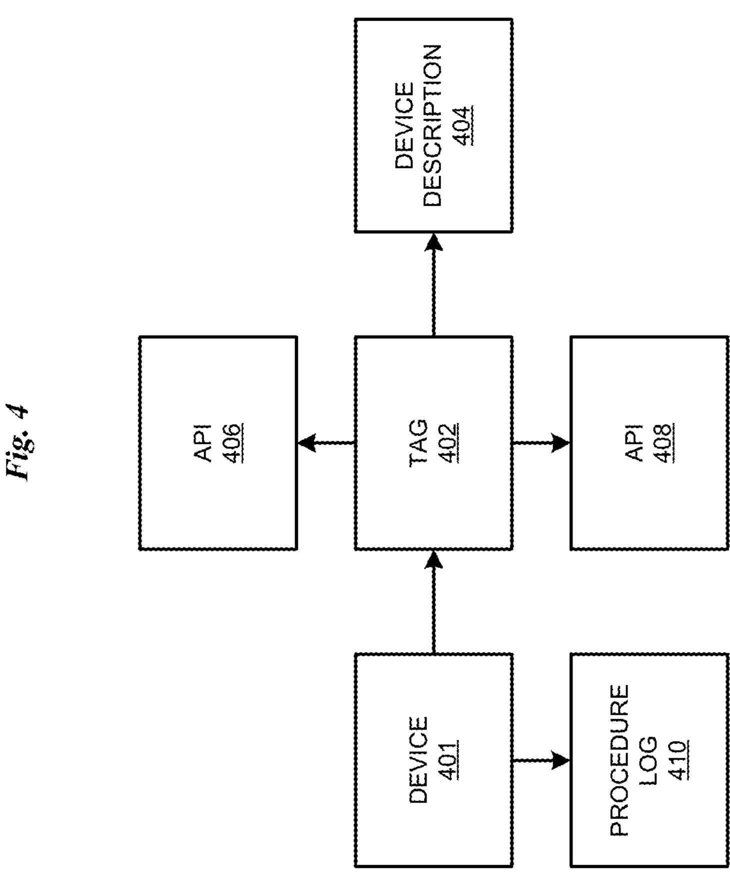
*Fig. 4*

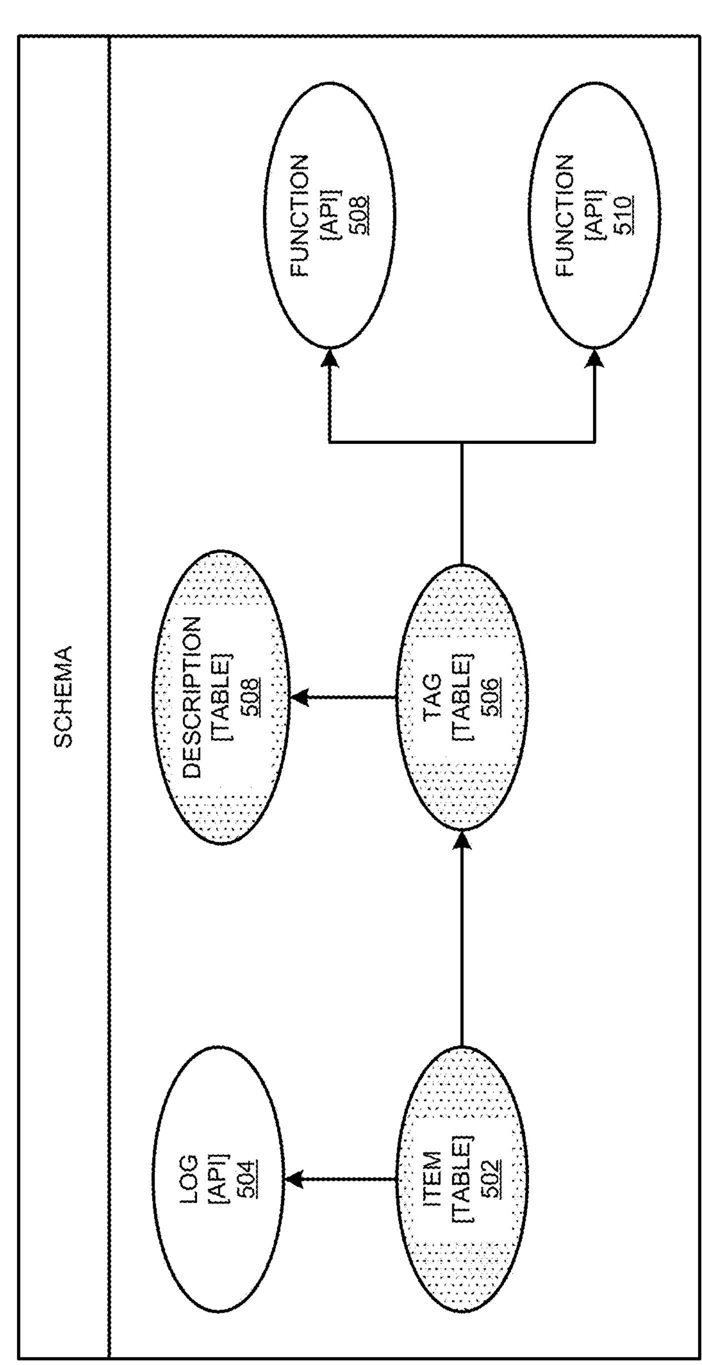
*Fig. 5*

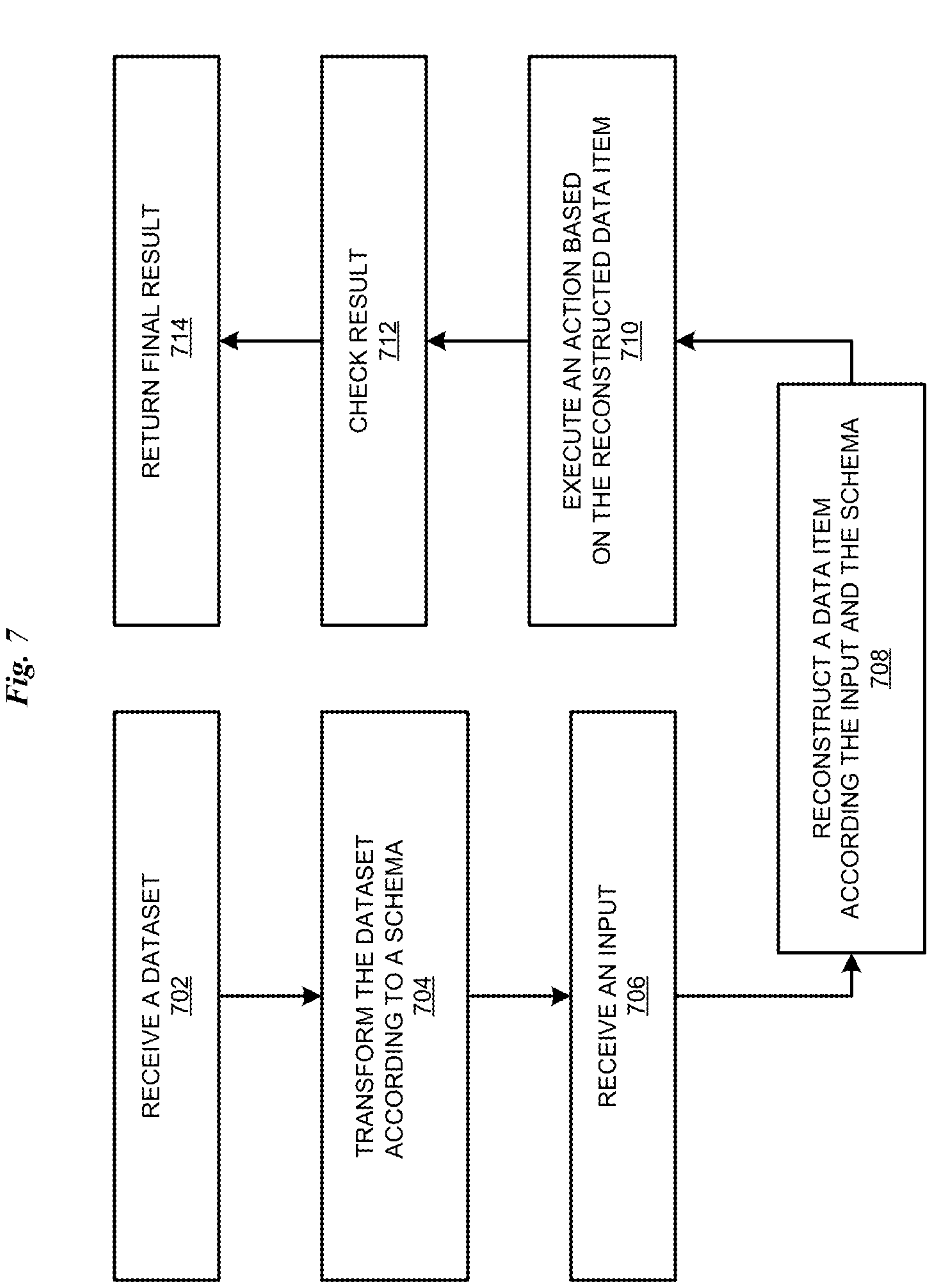
*Fig. 7*

HETEROGENOUS DATA INTEGRATION FOR LLM PROMPTING

BACKGROUND

The present invention relates generally to artificial intelligence. M ore particularly, the present invention relates to a method, system, and computer program for heterogeneous data integration for large language models.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Large Language Model (LLM) is a type of machine learning model designed for natural language processing tasks. An LLM may be trained on immense amounts of data, enabling the LLM to be capable of understanding and generating natural language and other types of content to perform a wide range of tasks. LLMs today may have the ability to infer from context, generate coherent and contextually relevant responses, translate between different languages, summarize text, answer questions, respond to queries, and even assist in creative writing or code generation tasks.

An artificial intelligence (AI) agent refers to a system or program that is capable of autonomously performing tasks on behalf of a user or another system by designing its workflow and utilizing available tools. AI agents can encompass a wide range of functionalities beyond natural language processing including decision-making, problem-solving, interacting with external environments, and executing actions. These agents can be deployed in various applications to solve complex tasks in various contexts from software design and IT automation to code-generation tools and conversational assistants. AI agents often leverage large language models (LLM s) to comprehend and respond to user inputs step-by-step and determine when to call on external tools. AI agents are sometimes referred to as LLM agents if they incorporate an LLM in their functioning.

A User Defined Function (UDF) is a custom function created by a user within a programming language or application to perform a specific task or calculation. A UDF typically includes a set of instructions that can accept parameters, process data, and return a result. Within the context of databases, a UDF can be used to encapsulate complex logic that can be reused across multiple queries or stored procedures. UDFs enhance code reusability, readability, and maintainability by allowing developers to modularize their code. Additionally, UDFs can improve performance by reducing the need to duplicate code in multiple places.

An Application Programming Interface (API) is a set of rules, protocols, and tools that allows different software applications to communicate with each other. An API defines the methods and data formats that applications can use to request and exchange information. APIs can be used to access functionality or data from a remote system, integrate different software systems, or extend the capabilities of an existing application. APIs are designed to abstract the underlying complexity of systems and provide a standardized way for applications to interact. By defining a clear interface, APIs enable developers to build on top of existing software components without needing to understand the internal implementation details.

SUMMARY

The illustrative embodiments provide a process heterogeneous data integration for LLM prompting. An embodiment includes establishing an integrated database, the integrated database comprising data from a set of heterogeneous data sources. The embodiment also includes intercepting, by a database management application, a user input query transmitted to a target system, the user input query written in a natural language format. The embodiment also includes transforming, by a natural language model within the database management application, the user input query into a structured query based on a relational schema, the transforming producing a formatted query. The embodiment also includes modifying the formatted query, the modifying replacing a reference to a virtual table within a call to a user-defined function (UDF), the modifying producing a final query. The embodiment also includes executing the final query, the executing comprising transmitting the final query to the integrated database, the transmitting causing executing a first responsive action based on the rewritten query, the executing the first responsive action producing a first execution result.

An embodiment includes intercepting a user input prompt input sent to a large language model. The embodiment also includes extracting a set of prompt features from the user prompt input, the set of prompt features comprising a set of context examples. The embodiment also includes constructing a set of test prompts using the set of context examples, wherein each test prompt of the set of test prompts comprises a different combination of context examples. The embodiment also includes executing the set of test prompts by the large language model, the executing producing a set of execution results. The embodiment also includes causing, responsive to executing the set of test prompts, an execution of a first specific instruction to execute an attribution scoring algorithm to compute an attribution score for each context example, the executing the attribution scoring algorithm producing a set of attribution scores, wherein each attribution score reflects a marginal contribution of a corresponding context example in producing the set of execution results. The embodiment also includes causing, responsive to producing the set of attribution scores, an execution of a second specific instruction to manipulate the user input prompt, the manipulating comprising replacing a portion of the user input prompt to include a candidate set of context examples, the candidate set of context examples comprising a subset of the context examples identified as providing a greatest combined performance metric based on the set of attribution scores, the manipulating producing a modified prompt input. The embodiment also includes causing, responsive to producing the modified prompt input, an execution of a fourth specific instruction that submits the modified prompt input to the large language model.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

FIG. 4 depicts a block diagram of an example system including heterogenous data in accordance with an illustrative embodiment;

FIG. 5 depicts a block diagram of an example schema in accordance with an illustrative embodiment;

FIG. 7 depicts a flowchart of an example process for LLM prompting using integrated heterogenous data.

DETAILED DESCRIPTION

Figure 2:
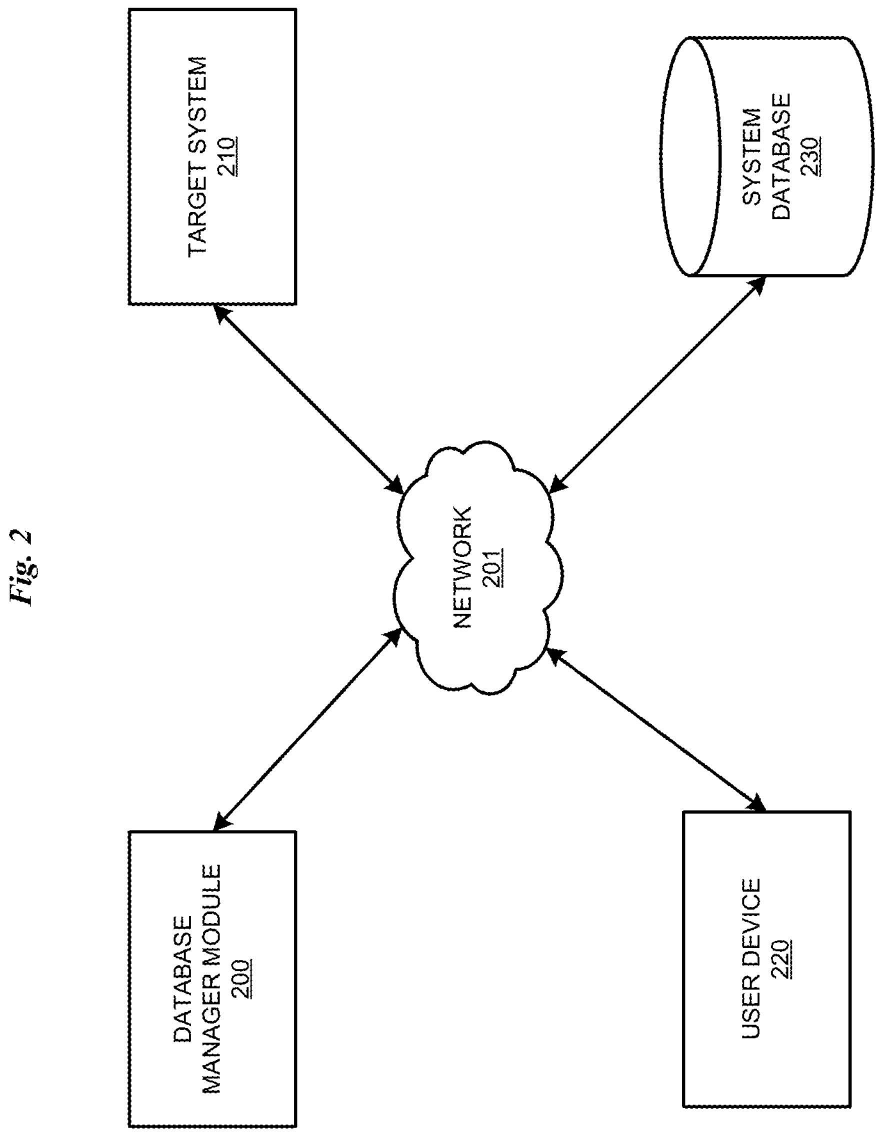
FIG. 2 depicts a block diagram of an example computing environment in accordance with an illustrative embodiment.

Large language models (LLMs) are currently used in a variety of generative applications. LLMs leverage advanced natural language processing capabilities to generate natural language and provide advanced chatbot interactions. In addition to their applications in content creation, LLM s are also employed various other tasks, such as sentiment analysis, text summarization, question-answering systems, and personalized recommendation engines. The versatility of LLMs enables them to adapt to various domains and tasks, making them particularly useful tools for enhancing natural language understanding and communication in a wide array of applications across industries.

Systems and organizations leverage LLMs to aid in answering user questions and perform actions based on user input questions queries. In many cases, the functionalities of an LLM may be specifically tailored to the system or organization. Accordingly, an LLM may be trained on specific use-case data, as well as may be able to access specific internal data from various systems of an organization when generating a response to a query. For example, an LLM may be configured to access a particular database to retrieve specific information to answer a question. As another example, an LLM may be configured to access a particular application programming interface (API) to cause a device or component to perform a particular action accomplish a task.

In many instances, answers to user questions may be found in structured data sources such as spreadsheets, databases, or APIs, as well as unstructured text documents such as manuals or logs. Deriving the answer to a question often requires combining information from multiple sources that may be siloed from one another for various reasons, including their reliance on different access methods. Large Language Models are increasingly being used to access information in structured and unstructured forms. However, existing LLM-based systems further exacerbate the siloing problem because they employ LLM s that are targeted for just one type of data access (e.g. databases or APIs).

Siloed data sources are isolated repositories of data that are not easily accessible or interoperable with each other. When attempting to answer a question that necessitates information from these disparate sources, an LLM may generate inaccurate, incomplete, or irrelevant results due to lack of a unified view of the data. To address this challenge, data integration techniques may be employed to extract, transform, and load data from each siloed source into a centralized repository or platform. This process may include harmonizing data formats, resolving schema inconsistencies, and standardizing data structures to enable cross-source data querying and analysis. Accordingly, different access methods used by each siloed data source, such as APIs, databases, flat files, or proprietary systems, may be integrated into a common schema format that bridges the gap between these diverse access methods, allowing for seamless data retrieval and aggregation. By integrating data from siloed sources and harmonizing access methods, systems and organizations can create a unified data environment that facilitates comprehensive analysis and decision-making.

Accordingly, there is a need for LLM-based systems that can bridge across multiple data access methods. Despite improvement in LLMs and prompt-engineering techniques, LLMs are still ineffective and generating outputs in instances that may require combining information from multiple sources that may be siloed from one another for various reasons, including their reliance on different access methods. When attempting to answer a question or provide a response to a query, an LLM may benefit from various integration techniques to extract, transform, and load data from various siloed data sources.

The present disclosure addresses the deficiencies described above by providing a process (as well as a system, method, machine-readable medium, etc.) that develops database management system that integrates heterogenous data from various data sources that may be leveraged by an LLM during output generation in response to an input query. Embodiments of the present disclosure provide a novel architecture that facilitates the integration between various data types, such as databases, APIs, documents, and so forth.

Embodiments of the present disclosure include defining a User Defined Function (UDF) that encapsulates an API call within a programming language or application. In an embodiment, the UDF may include the appropriate code to construct the API request, send the request to the API endpoint, receive the response, and process the data returned by the API. In an embodiment, the UDF may accept parameters such as the API endpoint URL, request method (e.g., GET, POST), request headers, request body (if applicable), and any other relevant information needed to make the API call. The UDF may then use this information to construct the API request using standard HTTP protocols.

In an embodiment, once the API request is constructed, the UDF may send the request to the API endpoint using networking functions provided by the programming language or application. The UDF may wait for the API response and handle any errors or exceptions that may occur during the communication process. After receiving the API response, the UDF may process the data returned by the API according to the requirements of the application. This may involve parsing the response data, extracting relevant information, and formatting the data in a way that can be easily used by the calling code.

As used throughout the present disclosure, the term "prompting" refers to the process of providing a specific input, typically in the form of text, to guide the generation of an output by a large language model (LLM). The prompt serves as a starting point and context for the model to generate coherent and relevant output based on the provided input. The prompt influences the content, style, and structure of the generated output by conditioning the LLM's generation process.

The prompting mechanism of an LLM includes several components that work together to guide the generation of text by the LLM. The prompt serves as the initial input that influences the content generated by the model. The prompt may include a few words, a sentence, a paragraph, a code snippet, an image, or any other digital media that provides the context or theme for the generated output. The prompt may be further concatenated with an input sequence. The input sequence includes the prompt and any additional context or information that the model uses to generate an output. By combining the prompt with the input sequence, the model can generate an output that is relevant to the given prompt. The model produces an output based on the prompt and input sequence, taking into account the language patterns and context learned during training. The output reflects the influence of the prompt on the generated content.

As used throughout the present disclosure, the term "heterogenous data" refers to data that encompasses a variety of different types and/or sources of data. Heterogenous data originates from diverse formats such as documents, application programming interfaces (APIs), databases, spreadsheets, multimedia files, and more. Heterogenous data may consist of structured data (e.g., databases), semi-structured data (e.g., JSON or XML files), and unstructured data (e.g., text documents, images, videos). Embodiments of the present disclosure consider combining heterogeneous data from various (sometimes siloed) sources in a format accessible by an LLM based agent during a question-answering interaction session with a user.

Illustrative embodiments provide for establishing an integrated database. In an embodiment, the integrated database comprises data from a set of heterogeneous data sources. An embodiment includes intercepting, by a database management application, a user input query transmitted to a target system. In an embodiment, the user input query is written in a natural language format. An embodiment includes transforming, by a natural language model within the database management application, the user input query into a structured query based on a relational schema. In an embodiment, the transforming the structured query produces a formatted query. An embodiment includes modifying the formatted query, the modifying replacing a reference to a virtual table within a call to a user-defined functions (UDF). In an embodiment, the modifying the format query produces a final query. An embodiment includes executing the final query, the executing comprising transmitting the final query to the integrated database. In an embodiment, the transmitting causes execution of a first responsive action based on the final query, the executing the first responsive action producing a first execution result.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a block diagram of a computing environment 100. Computing environment 100 contains an example of an environment for the execution of at least some of the computer code involved in performing the inventive methods, such as database management module 200 that integrates heterogenous data into a platform accessible for an LLM. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

FIG. 2 depicts a block diagram of an example computing environment in accordance with an illustrative embodiment. In the illustrated embodiment, the database manager module 200 includes the database manager module 200 of FIG. 1. In the illustrative embodiment, the database manager module 200 is configured to integrate heterogenous data types for access and utilization by a large language model (LLM).

In an embodiment, the database manager module 200 is configured to provide holistic, unified natural language access to information accessed via database ("DB") calls and APIs, thereby creating an LLM-powered experience grounded in a specific domain. An embodiment includes creating a single coherent representation of the domain from the following inputs. An embodiment includes an abstract schema that provides a global view of data source properties and interrelationships in a generic format that is agnostic to whether a data source is a database table. An embodiment includes an API mapping schema that provides information necessary to invoke an API call, such as the URL, the method (POST, GET, etc.), and details of the input and output parameters.

In response to a query, an embodiment includes executing a multi-step process in which LLM prompts are composed dynamically from the input schema, and the query results from the LLM are retrieved and checked according to rules that enable the system to detect errors. If desired, warranted, or otherwise necessary or useful, the prompts may be corrected and resubmitted to the LLM. A final result is produced by assembling results of the various API and DB calls.

In an embodiment, the abstract schema manifests in the form of an entity-relationship diagram. Accordingly, the abstract schema provides a global view of the data source properties and interrelationships between data points. In an embodiment, the format of the data is agnostic towards the source of the data, e.g., whether the data source is a DB table or an API.

In an embodiment, the API Mapping Schema provides any relevant or necessary information to invoke an API call, such as for example, URL, the method (POST, GET, etc.), details of the input and output parameters, and so forth.

In an embodiment, database manager module 200 comprises an LLM agent configured to process natural language questions and in response generate an SQL statement given a unified relational representation of both available databases and APIs. In an embodiment, APIs are represented as virtual tables. In an embodiment, the LLM agent manages a step-by-step reasoning process using a tailored LLM prompt, table selector mechanism, and a query rewriter mechanism.

In an embodiment, database manager module 200 comprises a table selector mechanism. In an embodiment, the table selector mechanism uses a Mixtral 8×7b to examine the input question and identify the related tables. In some embodiments, a finetuned model may be used to identify relevant tables and columns.

In an embodiment, database manager module 200 comprises a query rewriter mechanism. In an embodiment, the query rewriter mechanism is configured to bridge the physical and logical representation of data entities. In an embodiment, the query rewriter mechanism rewrites the LLM generated SQL queries by replacing mentions of virtual tables with User-Defined Functions (UDFs) that invoke external APIs. In an embodiment, the query rewriter mechanism uses a static analysis of the generated SQL query. For example, suppose the table is saved as "performance" in A pi Mapping Schema. In such case, the name may be replaced with the corresponding UDF name, such as for example "performance_udf" which is a function call in the database.

In an embodiment, database manager module 200 comprises a guardrail enforcer mechanism. In an embodiment, the guardrail enforcer mechanism is configured to monitor the step-by-step reasoning process of the LLM agent. In some embodiment, the guardrail enforcer mechanism applies a set of hints or rules that cause the LLM agent to detect and correct errors. Some examples of potential errors to detect and correct may include, but are not limited to, the following: entity names and properties must be valid, API signatures and parameters must be valid, column names must exist in table schema, and so forth.

In an embodiment, database manager module 200 comprises an LLM agent configured for various processing tasks as described herein. In an embodiment, the LLM agent includes a ReACT agent configured with various tools, and may be used in part in an agent based approach that may include the following disclosed aspects. Embodiments include explanations provided by the reasoning step-by-step problem decomposition and curated table selection for large schemas.

In an embodiment, the guardrail mechanism detects potential issues and executes a specific program instruction to deterministically fix them if possible (preprocessing & postprocessing) or alternatively provide hints to the LLM to guide the generation of a desired output. In an embodiment, the process provides a deterministic translation from a pure relational data model presented to the LLM to the real hybrid model in the customer environment (i.e., DBs, APIs, and documents).

An embodiment includes prompting a large language model associated with target system 210. In an embodiment, a user accessing user device 220 prompts a large language model executed as a part of target system 210 with a prompt that contains a request for data retrieval and/or performance of a desired action over any suitable network 201. The prompt may provide targeted guidance and relevant information to the model, influencing its text generation process towards producing accurate and contextually appropriate outputs.

In the illustrated embodiment, system database 230 includes a repository for all data related to target system 210. In an embodiment, the system database 230 stores one or datasets according to a schema, as described in greater detail herein. In an embodiment, the system database 230 stores heterogenous data. In an embodiment, the system database 230 stores one or more sets of prompting instructions. In an embodiment, the system 230 stores one or more sets of test cases for evaluating utility and/or performance of an output. In an embodiment, the system database 230 stores one or more sets of training data for training one or more machine learning models.

In the illustrated embodiment, user device 220 includes a computing device configured to facilitate user interaction with the database manager module 200, thereby enabling a user to engage with the management of various operations related to target system 210. Accordingly, user device 220 may serve as an interface through which users can communicate instructions, commands, or requests to the database manager module 200, initiating related actions and overseeing the target system's performance. Through user device 220, a user can access a user interface or application that allows the user to interact with the database manager module 200. Users may input commands, configure settings, and monitor system performance through the interface provided by user device 220.

In an embodiment, user device 220 may support various communication channels, such as a graphical user interface (GUI), a command-line interface (CLI), a web-based portal, or a mobile application, depending on the system's design and user requirements. Users can communicate with the database manager module 200 in real-time to view visualizations related to operations disclosed herein.

Figure 3:
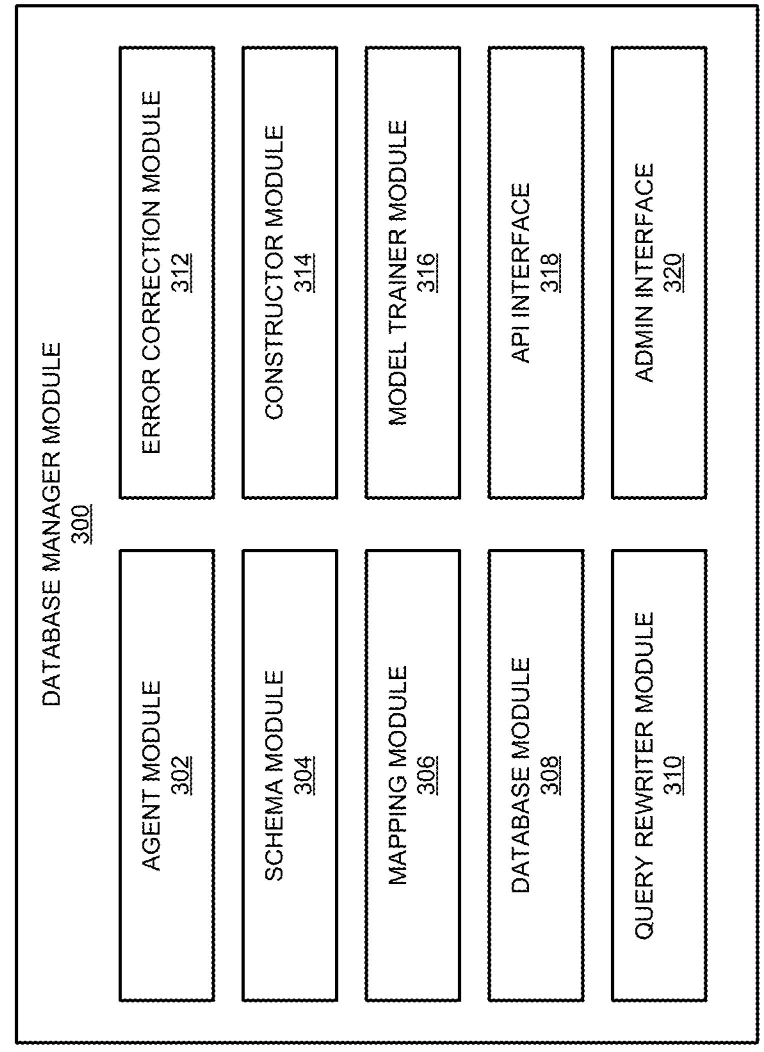
FIG. 3 depicts a block diagram of an example software module in accordance with an illustrative embodiment.

FIG. 3 depicts a block diagram of an example database manager module 300 in accordance with an illustrative embodiment. In the illustrated embodiment, database manager module 300 is an example of database manager module 200 of FIGS. 1 and 2.

In the illustrated embodiment, the database manager module 300 includes a software module including a plurality of other software modules, including an agent module 302, a schema module 304, a mapping module 306, a database module 308, a query rewriter module 310, an error correction module 312, a constructor module 314, a model trainer module 316, an API interface module 318, and an administrator module 320. In alternative embodiments, database manager module 300 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the database manager module 300 comprises a physical computing device, including but not limited to, a general-purpose computer, a mainframe computer, a supercomputer, a quantum computer, a computer server, a personal computer, a laptop, a smartphone, a tablet, a personal digital assistant (PDA), etc., and any combination thereof. In some embodiments, the database manager module 300 comprises specialized hardware, such as for example, an Application-Specific Integrated Circuit (ASIC) or Field-Programmable Gate Array (FPGA) for accelerated processing of specific tasks, routines, algorithms, training operations, etc. In some embodiments, the database manager module 300 may include a combination of physical and virtualized components, as well as may be partially or entirely virtualized on a virtual machine.

In the illustrated embodiment, the agent module 302 includes a software module configured to deploy an LLM based agent to perform the example processing functions described herein. In an embodiment, the agent module 302

In the illustrated embodiment, the schema module 304 includes a software module configured to generate and maintain an abstract schema that represents the structure and relationships of various heterogeneous data sources, including both traditional databases and APIs. This abstract schema takes the form of an entity-relationship diagram that abstracts away physical storage details and expresses entities uniformly, regardless of whether they are stored in SQL tables, NoSQL collections, or accessed through API endpoints. The schema module may further convert this abstract schema into a relational schema used at runtime by other system components, facilitating SQL query generation and interpretation by large language models.

In the illustrated embodiment, the mapping module 306 includes a software module configured to configured to store and manage metadata necessary for invoking external APIs, including endpoint URLs, supported HTTP methods (e.g., GET, POST), parameter types, and expected response formats. This module works in tandem with the schema module by associating each virtual table in the relational schema with a corresponding API definition. The mapping module may extract such metadata from specifications or other documentation sources and provides useful input to the query rewriting and execution processes, enabling dynamic invocation of APIs during query processing.

In the illustrated embodiment, the database module 308 includes a software module configured to interface with one or more relational database management systems (RDBMS), execute SQL queries, and retrieve result sets. This module acts as the central hub for accessing persistent data from structured sources, including both native database tables and virtual tables backed by APIs. It is further configured to support user-defined functions (UDFs) that enable external API invocations to be embedded directly within SQL queries. The database module ensures seamless execution of queries across the integrated data environment by interpreting schema definitions, managing query plans, and executing final queries.

In the illustrated embodiment, the query rewriter module 310 includes a software module configured to process initial SQL queries generated by a language model and transform them into executable SQL queries by rewriting references to virtual tables into appropriate UDF calls. This rewriting process involves syntactic and semantic analysis of the query to extract filter conditions and parameter values needed to invoke corresponding APIs. The query rewriter module ensures that the generated query conforms to the execution requirements of the database engine while preserving the logic of the original user query. It bridges the logical abstraction of APIs as relational tables with their physical invocation mechanisms.

In the illustrated embodiment, the error correction module 312 includes a software module configured to detect and resolve errors that may arise during SQL query generation and rewriting, including schema mismatches, invalid table or column references, and incorrect API parameters. This module, also referred to as a guardrail enforcer, applies a set of predefined validation rules and, upon detecting a violation, provides corrective hints or instructions to the large language model to regenerate the query in a compliant form. By actively monitoring intermediate steps in the query construction and validation pipeline, the error correction module ensures robustness and reliability in query execution.

In the illustrated embodiment, the constructor module 314 includes a software module configured to orchestrate the end-to-end assembly of a complete, validated SQL query that may include both database table access and API invocations. This module integrates the outputs of the language model, query rewriter, and error correction modules to construct the final SQL query submitted to the database engine. In an embodiment, the constructor module 314 manages temporary tables used to store intermediate query results, ensuring that the execution process remains explainable and secure. The constructor module plays a critical role in generating executable queries that answer user questions accurately while conforming to data access constraints.

In the illustrated embodiment, the model trainer module 316 includes a software module configured to train one or more machine learning models described herein. In an embodiment, model trainer module 316 includes a data preparation module, an algorithm module, a training engine, and a machine learning model. In alternative embodiments, model trainer module 316 can include some or all of the functionality described herein but grouped differently into one or more modules. In some embodiments, model trainer module 316 generates a machine learning model based on one or more known machine learning algorithms. In an embodiment, model trainer module 316 includes a training engine that trains machine learning model using training a dataset.

In the illustrated embodiment, the model trainer module 316 is configured to train a large language model using curated set of example-pairs, prompts, and recommendations generated by the system and/or from external sources. In an embodiment, the training process includes fine-tuning, transfer learning, and/or reinforcement learning, to enhance the model's performance and accuracy. Through iterative training iterations, the module refines the model's generation abilities, fine-tunes its parameters, and adjusts its behavior based on the feedback received during the training process. In an embodiment, model trainer module 316 continuously evaluates the model's performance against predefined evaluation metrics and thresholds to monitor training progress and ensure that trained model meets the desired standards of accuracy and quality. By analyzing the model's outputs and comparing them against the defined metrics, the model trainer module 316 iteratively refines the model's training process to optimize generation performance.

In the illustrated embodiment, the API interface module 318 serves as the interface through which users and/or applications interact with the database manager module 300 and/or agents orchestrated by the database manager module 300 and facilitates the exchange of information between the users and/or applications and these modules. In an embodiment, the application interface module 318 is configured to interact with any or all other modules within database manager module 300 to retrieve, transmit, store, and/or modify information and/or execute functions and operations as described herein. In some embodiments, API interface module 318 connects with API gateway via any suitable network or combination of networks such as the Internet, etc. and uses any suitable communication protocols such as Wi-Fi, Bluetooth, etc. to connect to external systems required to access to perform certain tasks. Further, the API gateway may transmit service requests received from a client interacting with database manager module 300.

In the illustrated embodiment, administrator module 320 allows users with administrative privileges to perform various administrative tasks associated with database manager module 300 as described herein. For example, in some embodiments, administrative user module 320 allows a user with administrative privileges to initiate a data collection process. As another example, in some embodiments, administrator module 320 allows a user with administrative privileges to initiate and monitor the training process performed by model trainer module 316, including setting desired parameters and/or hyperparameters for the training process.

In an embodiment, administrator module 320 includes a user interface configured to allow a user having sufficient privileges to oversee the operation and management of a large language model-based system. In an embodiment, administrator module 320 controls access permissions, monitors system performance, and handles any administrative tasks related to the platform. In an embodiment, the administrator module 320 interacts with any or all other modules to promote compliance with the administrative settings. Further, a backend administration system allows users with administrative privileges to perform various administrative tasks associated with the module as described herein, such as initiating a data collection and/or correlation process, a neural network training process, defining optimization goals, defining execution parameters/criteria, and any other defined settings discussed herein.

FIG. 4 depicts a block diagram of an example entity relationship diagram, in accordance with an illustrative embodiment. In a particular embodiment, the diagram 400 models a data structure suitable for industrial systems, IoT platforms, or other frameworks where semantic access to sensor data and system behavior may be useful via both human-readable descriptions and machine-readable APIs.

In the illustrated embodiment, the device 401 represents a physical or virtual machine or component in an industrial or technical system. In the illustrated embodiment, the device 401 is associated with a tag 402. Embodiments of the present disclosure consider a one-to-many or one-to-one relationship, such that each device can have one or more tags. Further, in the illustrated embodiment, the device 401 generates entries in a procedure log 410 which records operational or maintenance events involving the device 401. In an embodiment, the procedure log 410 captures logs or records of procedures associated with the Device 401 which may include, but are not limited to, operation events, maintenance events calibrations, operational anomalies or interventions, and so forth.

In an embodiment, a tag 402 may serve as a semantic identifier for a property, signal, or point of measurement associated with the device 401. In some embodiments, the tag 402 corresponds to a sensor value or control parameter. In an embodiment, the tag 402 is linked to a device description 404, which may include metadata explaining the tag's meaning, range, purpose, and so forth. In an embodiment, the device description 404 stores metadata or structured definitions of what a given tag its device represents, such as engineering units, signal type (e.g., analog, digital), operational thresholds, descriptive labels, and so forth In an embodiment, the tag 402 is associated with a first API 406 and a second API 408. In an embodiment, each API may provide access to data related to the tag 402, which may include, but is not limited to, current values or metrics, or historical values, alarms, or control settings. In an embodiment, each of the APIs provide different access to tag-related data or services.

FIG. 5 depicts a block diagram of an example schema. In an embodiment, the abstract schema 500 as well as the API Mapping Schema may be provided manually or extracted from domain metadata. If a database schema is provided, the abstract schema 500 may be extracted from it automatically. In an embodiment, the API Mapping Schema can be extracted automatically from documents. For systems that mix DB access and API calls, the edges between API and DB nodes in the Abstract Schema may be augmented by expert knowledge if deemed necessary or useful. Once the abstract schema 500 is created, a relational schema may be automatically generated from the abstract schema 500. The DB Table represents all entities consistently as tables regardless of whether they are database tables or virtual tables.

In the illustrated embodiment, the abstract schema 500 models the structure and interrelationships between data entities drawn from both traditional relational databases and external APIs. This abstraction enables question-answering over heterogeneous data sources in LLM based systems. The diagram visually merges tables and APIs under a single schema boundary, thereby treating APIs as virtual tables. In the illustrated embodiment, the abstract schema 500 is shown comprising a combination of DB tables and APIs, as described in greater detail herein.

In the illustrated embodiment, the item 502 represents an entity that represents a traditional relational database table. In some embodiments, an item may correspond to a physical asset, sensor, data object, or any other component or sub-component in an industrial system. In the illustrated embodiment, the item 502 is linked to the tag 506 represented as a database table, indicating that each item in a system may be associated with one or more semantic tags or identifiers.

In the illustrated embodiment, the procedure log 504 represents a virtual table representing an API endpoint that returns logs, historical entries, or audit trails related to a given item 502. Accordingly, a virtual table behaves like a database table from the system's perspective, but in this instance is backed by an API, invoked through a user-defined function (UDF). For example, log entries or records related to the item can be retrieved dynamically via an API encapsulated by a UDF.

In the illustrated embodiment, a first function 508 and a second function 510 both represent different API-based virtual tables, invoked through UDFs in the relational schema. In an embodiment, the functions perform operations on or retrieve data related to a tag 506. Each of these functions may be associated with a distinct external API endpoint and is mapped to behave, from the perspective of the system, like a conventional relational table. These virtual tables are integrated into the unified schema such that SQL queries generated by a large language model (LLM) or other query construction system can reference the functions as though they were static tables. Although their implementation resides outside the database, their inclusion in the schema as virtual tables allows them to participate in SQL join operations, filtering, and projections.

In the illustrated embodiment, at runtime, when a SQL query references either virtual table, the system may employ query rewriter module that replaces the virtual table name with a call to the corresponding UDF, supplying the necessary parameters derived from the query itself. The database engine is configured to recognize and execute these UDFs, which in turn invoke the appropriate external APIs and return the results in tabular form. This abstraction enables the seamless integration of heterogeneous data sources and remote computations into a unified environment, facilitating complex reasoning over both stored and dynamically retrieved data.

Figure 6:
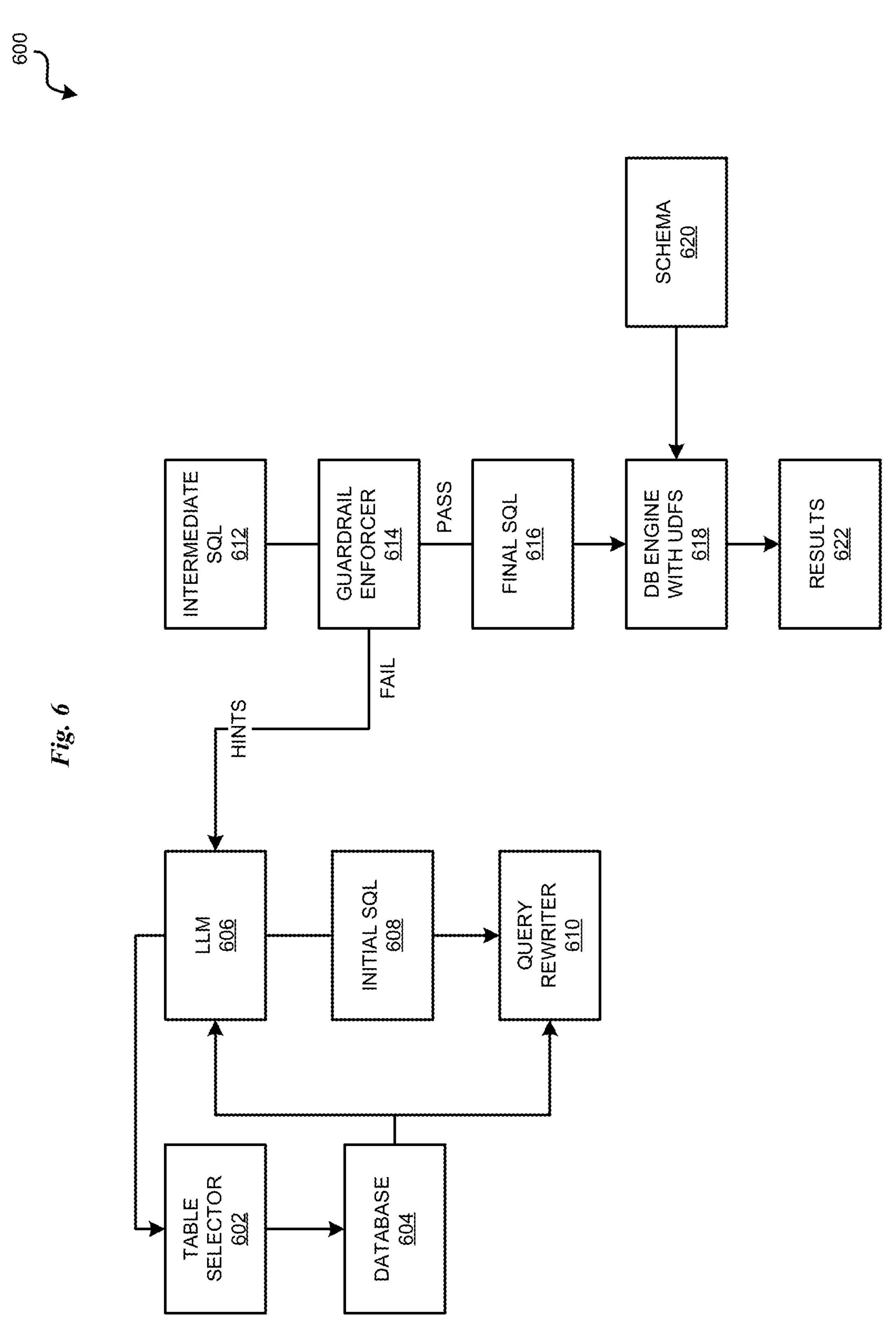
FIG. 6 depicts a block diagram of an example process for LLM prompting using integrated heterogenous data with an illustrative embodiment.

FIG. 6 depicts a block diagram of an example process in accordance with an illustrative embodiment. In an embodiment, database manager module 200 of FIGS. 1 and 2, database manager module 300 of FIG. 3 carries out some or all of the steps of process 600.

In an embodiment, the table selector module 602 uses a Large Language Model (LLM) to analyze a user's natural language query and determine which database tables or virtual tables (APIs represented as tables) are likely to be relevant for answering the query. This step helps reduce prompt size and ensures only pertinent schema information is used, particularly in cases with many tables/columns. In an embodiment, database 604 includes a structured data source that includes traditional database tables but may also contain virtual tables that correspond to APIs or other documents. All these entities are represented in a unified relational schema.

In an embodiment, the Large Language Model 606 interprets the user's natural language query and generates an Initial SQL query (block 608) over a unified schema. This LLM sees both database tables and APIs (via virtual tables) as a flat, relational structure, simplifying the query generation process. In an embodiment, a first SQL query is generated by the LLM 606 based on the user's question and the selected tables. However, this query may still refer to virtual tables (APIs) and may need to be transformed before execution. In an embodiment, the Query Rewriter 610 converts the initial SQL query 608 into an intermediate form by replacing virtual table references with User Defined Function (UDF) calls that encapsulate API invocations. This step maps the logical SQL query into an executable query that can call external APIs correctly.

In the illustrated embodiment, the intermediate SQL 612 is the rewritten query, which now uses UDFs instead of virtual table names. In the illustrated embodiment, the guardrail enforcer mechanism 614 checks the intermediate SQL 612 for validity using predefined rules (e.g., valid table/column names, correct API parameter types). If the query violates any rules, hints are sent back to the LLM (606), allowing it to regenerate or revise the query. If the query passes, it's moved forward for execution. In the illustrated embodiment, the final SQL 616 represents the validated SQL query that includes API UDF calls and is ready for execution by the database engine 618.

In the illustrated embodiment, block 618 represents the database engine configured to execute SQL queries with UDFs. These UDFs internally invoke APIs as necessary and are considered on equal footing with traditional database table access. In the illustrated embodiment, schema 620 provides the structural definitions needed by the DB engine to understand the format of tables and UDFs, whether they originate from databases or APIs. In an embodiment, the schema 620 includes both the relational schema (derived from the abstract and API mapping schemas) and the UDF metadata. In an embodiment, at block 622, the answer to the original natural language question, derived from executing the validated and rewritten SQL query that may span both database and API sources, is returned to a user.

FIG. 7 depicts a flowchart of an example process for transforming and interacting with heterogeneous datasets in an integrated LLM based system. In an embodiment, database manager module 200 of FIGS. 1 and 2, database manager module 300 of FIG. 3 carries out some or all of the steps of process 700.

In an embodiment, at step 702, the process includes receiving datasets. In an embodiment, the one or more datasets originates from one or more structured data sources. These may include SQL databases, NoSQL stores, APIs, documents, and so forth. In some embodiments, the dataset can originate from industrial applications (e.g., sensor data, device logs, external API feeds). In some embodiments, the heterogenous data received includes a combination of tables, API specifications, metadata, and so forth.

In an embodiment, at step 704, the process includes transforming the dataset according to a schema. In an embodiment, the received dataset is transformed into a unified relational schema using an abstract schema and API mapping schema. This transformation abstracts the physical differences between databases and APIs, enabling the system to represent all data sources uniformly as relational tables or virtual tables. APIs are mapped to virtual tables, each backed by a User Defined Function (UDF) for invocation.

In an embodiment, at step 706, the process includes receiving an input. In an embodiment, the input includes a query expressed in natural language. This input may be processed by a Large Language Model (LLM) that will use the relational schema to understand which tables or APIs (virtual tables) may be needed to fulfill the request.

In an embodiment, at step 708, the process includes reconstructing a data item according to the input and the schema. In an embodiment, based on the input and the schema, the process reconstructs a data retrieval expression (e.g., SQL query) that expresses the user's intent. In an embodiment, if APIs are involved, the process may leverage a query rewriter mechanism to transform the query by substituting references to virtual tables with UDFs that call the appropriate APIs with correctly inferred parameters.

In an embodiment, the process includes analyzing the formatted query to determine argument values to pass into the UDF corresponding to the virtual table. This analysis may include parsing the query to identify the specific UDF corresponding to the virtual table mentioned in the query. In an embodiment, the process leverages a query parser component that is responsible for breaking down the formatted query into its constituent parts. The query parser may utilize a parsing algorithm to identify the UDF being called and extract the argument values being passed into it. This step determines the exact parameters that need to be supplied to the UDF for correct execution.

In an embodiment, the process leverages a UDF resolver component that matches the identified UDF with the corresponding virtual table. In an n embodiment, the process leverages an argument value extractor component that is responsible for extracting the argument values from the formatted query. The argument value extractor uses parsing techniques to locate and retrieve the specific values that are being passed as parameters to the UDF. This extraction process prepares the UDF for execution with the correct input parameters. In an embodiment, the process leverages a parameter validation component that validates the extracted argument values before passing them to the UDF. The parameter validation component may check the data types, ranges, and formats of the argument values to ensure they meet the requirements specified by the UDF. This validation step helps prevent errors and ensures the UDF receives valid input for processing the query.

In an embodiment, at step 710, the process includes executing an action based on the reconstructed data item. This may involve making one or more API calls via UDFs and/or querying local or remote databases. In an embodiment, the reconstructed query is validated prior to execution. In an embodiment, the process may leverage a guardrail enforcer checks for semantic correctness (e.g., correct column names, valid API parameters) before execution, ensuring robust interaction with the data environment.

In an embodiment, at step 712, the process includes checking the output result. In an embodiment, after execution, the process examines the query result for correctness or completeness. This may include verifying the result against expected formats or applying rules to determine whether the information fully answers the user query. In some embodiments, the process includes performing one or more intermediate result analyses to support multi-step reasoning procedures.

In an embodiment, at step 714, the process includes returning a final result to a user. In some embodiments, this output may include, but is not limited to, a table, a value, a summary, an explanation, and/or may manifest in any other form depending on how the system was configured and what type of query was input. The result provides a natural language interface to an integrated data backend that integrates various heterogenous data to provide relevant, accurate, and robust answers to user questions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

establishing an integrated database, the integrated database comprising data from a set of heterogeneous data sources;

intercepting, by a database management application, a user input query transmitted to a target system, the user input query written in a natural language format;

transforming, by a natural language model within the database management application, the user input query into a structured query based on a relational schema, the transforming producing a formatted query;

modifying the formatted query, the modifying replacing a reference to a virtual table within a call to a user-defined functions (UDF), the modifying producing a final query, wherein the virtual table corresponds to an application programming interface (API), and wherein modifying comprises replacing the virtual table reference with the user-defined function call that encapsulates an external API request; and executing the final query, the executing comprising transmitting the final query to the integrated database, the transmitting causing executing a first responsive action based on the final query, the executing the first responsive action producing a first execution result.

2. The computer-implemented method of claim 1, wherein the relational schema includes a combination of a database table corresponding to database records and a virtual table corresponding to an application programming interface (API).

3. The computer-implemented method of claim 1, wherein the relational schema includes a combination of a database table corresponding to database records and a virtual table corresponding to a set of documents.

4. The computer-implemented method of claim 1, the method further comprising:

validating, by a guardrail module within the database management application, the formatted query prior to modifying the formatted query, the validating comprising checking for semantic consistency between the formatted query and the relational schema.

5. The computer-implemented method of claim 1, wherein transforming the user input query further comprises:

selecting, using a table selector module within the database management application, a subset of tables from the integrated database based on an analysis of content within the user input query.

6. The computer-implemented method of claim 1, wherein the modifying further comprises causing an execution of a first specific program instruction, the execution of the first specific program instruction causing analyzing the formatted query to determine argument values to pass into the UDF corresponding to the virtual table.

7. The computer-implemented method of claim 1, wherein the integrated database is configured to execute user-defined functions within SQL queries.

8. The computer-implemented method of claim 1, further comprising checking the first execution result against one or more conditions and returning an output based on the checking.

9. A computer program product comprising one or more computer readable storage media, and program instructions collectively stored on the one or more computer readable storage media, the program instructions executable by a processor to cause the processor to perform operations comprising:

establishing an integrated database, the integrated database comprising data from a set of heterogeneous data sources;

intercepting, by a database management application, a user input query transmitted to a target system, the user input query written in a natural language format;

transforming, by a natural language model within the database management application, the user input query into a structured query based on a relational schema, the transforming producing a formatted query;

modifying the formatted query, the modifying replacing a reference to a virtual table within a call to a user-defined functions (UDF), the modifying producing a final query, wherein the virtual table corresponds to an application programming interface (API), and wherein modifying comprises replacing the virtual table reference with the user-defined function call that encapsulates an external API request; and executing the final query, the executing comprising transmitting the final query to the integrated database, the transmitting causing executing a first responsive action based on the final query, the executing the first responsive action producing a first execution result.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

12. The computer program product of claim 9, wherein the relational schema includes a combination of a database table corresponding to database records and a virtual table corresponding to an application programming interfaces (API).

13. The computer program product of claim 9, wherein the relational schema includes a combination of a database table corresponding to database records and a virtual table corresponding to a set of documents.

14. The computer program product of claim 9, further comprising:

validating, by a guardrail module within the database management application, the formatted query prior to modifying the formatted query, the validating comprising checking for semantic consistency between the formatted query and the relational schema.

15. The computer program product of claim 9, wherein transforming the user input query further comprises:

selecting, using a table selector module within the database management application, a subset of tables from the integrated database based on an analysis of content within the user input query.

16. The computer program product of claim 9, wherein the modifying further comprises causing an execution of a first specific program instruction, the execution of the first specific program instruction causing analyzing the formatted query to determine argument values to pass into the UDF corresponding to the virtual table.

17. The computer program product of claim 9, wherein the integrated database is configured to execute user-defined functions within SQL queries.

18. The computer program product of claim 9, further comprising checking the first execution result against one or more conditions and returning an output based on the checking.

19. A computer system comprising a processor and one or more computer readable storage media, and program instructions collectively stored on the one or more computer readable storage media, the program instructions executable by the processor to cause the processor to perform operations comprising:

establishing an integrated database, the integrated database comprising data from a set of heterogeneous data sources;

intercepting, by a database management application, a user input query transmitted to a target system, the user input query written in a natural language format;

transforming, by a natural language model within the database management application, the user input query into a structured query based on a relational schema, the transforming producing a formatted query;

modifying the formatted query, the modifying replacing a reference to a virtual table within a call to a user-defined functions (UDF), the modifying producing a final query, wherein the virtual table corresponds to an application programming interface (API), and wherein modifying comprises replacing the virtual table reference with the user-defined function call that encapsulates an external API request; and executing the final query, the executing comprising transmitting the final query to the integrated database, the transmitting causing executing a first responsive action based on the final query, the executing the first responsive action producing a first execution result.

20. The computer system of claim 19, wherein the relational schema includes a combination of a database table corresponding to database records and a virtual table corresponding to an application programming interfaces (API).

* * * * *